US009871732B2

(12) United States Patent
Lewin-Eytan et al.

(10) Patent No.: US 9,871,732 B2
(45) Date of Patent: Jan. 16, 2018

(54) DYNAMIC FLOW CONTROL IN MULTICAST SYSTEMS

(71) Applicant: International Business Machines Corporation, Armonk, NY (US)

(72) Inventors: Liane Lewin-Eytan, Binyamina (IL); Nir Naaman, Haifa (IL); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 14/722,196

(22) Filed: May 27, 2015

(65) Prior Publication Data
US 2015/0256464 A1 Sep. 10, 2015

Related U.S. Application Data

(63) Continuation-in-part of application No. 13/663,500, filed on Oct. 30, 2012, now abandoned, which is a
(Continued)

(51) Int. Cl.
*H04L 12/18* (2006.01)
*H04L 12/801* (2013.01)
(Continued)

(52) U.S. Cl.
CPC .......... *H04L 47/15* (2013.01); *H04L 12/1877* (2013.01); *H04L 12/1881* (2013.01);
(Continued)

(58) Field of Classification Search
CPC .. H04L 12/1877; H04L 47/762; H04L 47/806
(Continued)

(56) References Cited

U.S. PATENT DOCUMENTS 6,286,052 B1 9/2001 McCloghrie et al.
6,336,119 B1 1/2002 Banavar et al.
(Continued)

FOREIGN PATENT DOCUMENTS

JP 2008537612 A 9/2008

OTHER PUBLICATIONS

Tock et al. "Hierarchical Clustering of Message Flows in a Multicast Data Dissemination System." Proceedings of the 17th IASTED International Conference Parallel and Distributed Computing and Systems, Nov. 14-16, 2005, pp. 320-326.*
(Continued)

*Primary Examiner* — Melvin Marcelo
*Assistant Examiner* — Natali N Pascual Peguero
(74) *Attorney, Agent, or Firm* — Anthony Curro

(57) ABSTRACT

Enhancing performance in a multicasting system. Flow rates in a multicasting system are monitored as system characteristics change. The multicasting system is operated based on a first mapping between data flows and multicasting groups. Data is disseminated by way of the mapping to subscribers to one or more of the data flows. The flow rate thresholds of satisfied flows are decreased to minimize the difference between the flow rate thresholds and respective target transmission rates of the satisfied flows, as the system's feasible data transmission workload is maintained with respect to subscriber reception rate capacities. The flow rate thresholds of unsatisfied flows are increased to minimize the difference between the flow rate threshold and respective target transmission rates for the unsatisfied flows and to limit occurrences of data transmission delays or losses, as the system's feasible data transmission workload is maintained with respect to subscriber reception rate capacities.

12 Claims, 8 Drawing Sheets

Related U.S. Application Data continuation-in-part of application No. 13/346,747, filed on Jan. 10, 2012, now Pat. No. 8,750,131.

(51) Int. Cl.

| | |
|---|---|
| *H04L 12/927* | (2013.01) |
| *H04L 12/761* | (2013.01) |
| *H04L 12/923* | (2013.01) |
| *H04L 12/815* | (2013.01) |
| *H04L 12/911* | (2013.01) |

(52) U.S. Cl.
CPC .............. *H04L 45/16* (2013.01); *H04L 47/22* (2013.01); *H04L 47/762* (2013.01); *H04L 47/806* (2013.01); *H04L 47/822* (2013.01)

(58) Field of Classification Search
USPC ........................................ 370/230, 232, 235
See application file for complete search history.

(56) References Cited

U.S. PATENT DOCUMENTS

| | | | |
|---|---|---|---|
| 6,349,340 B1 | 2/2002 | Dyer et al. | |
| 6,728,715 B1 | 4/2004 | Astley et al. | |
| 7,293,109 B2 | 11/2007 | Ott et al. | |
| 7,523,208 B2 | 4/2009 | Auerbach et al. | |
| 7,680,900 B2 | 3/2010 | Duigenan et al. | |
| 7,937,433 B1 | 5/2011 | Kumar | |
| 8,122,118 B2 | 2/2012 | Hickson et al. | |
| 8,750,131 B2 | 6/2014 | Lewin-Eytan et al. | |
| 2005/0089050 A1* | 4/2005 | Cheriton ................. | H04L 12/18 370/397 |
| 2005/0237965 A1* | 10/2005 | Kuperschmidt ...... | H04L 1/0041 370/321 |
| 2006/0013139 A1* | 1/2006 | Koch .................... | H04J 3/1694 370/236 |
| 2008/0031243 A1* | 2/2008 | Gershinsky ......... | H04L 12/1859 370/390 |
| 2009/0006521 A1* | 1/2009 | Veal ....................... | H04L 45/00 709/201 |
| 2010/0011012 A1* | 1/2010 | Rawson .................. | H04L 67/30 707/E17.009 |
| 2011/0213872 A1 | 9/2011 | Santiago et al. | |
| 2011/0258268 A1 | 10/2011 | Banks et al. | |
| 2011/0310735 A1* | 12/2011 | Karagiannis .......... | H04L 43/045 370/232 |
| 2012/0059882 A1 | 3/2012 | Stark et al. | |
| 2013/0176851 A1 | 7/2013 | Lewin-Eytan et al. | |

OTHER PUBLICATIONS

Guimaraes et al. "A Genetic Algorithm for Multicast Mapping in Publish-Subscribe Systems", 2nd IEEE International Symposium on Network Computing and Applications, Apr. 16-18, 2003, pp. 1-20.*

Adler et al. "Channelization Problem in Large Scale Data Dissemination," International Conference on Network Protocols, IEEE, 2001, pp. 100-109.*

Rizzo, "pgmcc: a TCP-friendly single-rate multicast congestion control scheme," SIGCOMM 2000, Stockholm, Sweden, pp. 1-12.

Kim et al., "Efficacy of techniques for responsiveness in a wide-area publish/subscribe system," 11th International Middleware Conference Industrial track, Nov. 2010, Bangalore, India, pp. 40-45.

Amir et al., "A Cost-Benefit Flow Control for Reliable Multicast and Unicast in Overlay Networks," IEEE/ACM Transactions on Networking, vol. 13, 2005, pp. 1-13.

Abu-Libdeh et al., "Ajit: Distributed Rate-limiting for Multicast Networks," Computer Science Department, Cornell University, Tech. Rep., 2008, pp. 1-10.

Adler et al., "Channelization Problem in Large Scale Data Dissemination," International Conference on Network Protocols, IEEE, 2001, pp. 100-109.

Banerjee et al., "Scalable Application Layer Multicast," SIGCOMM '02, Proceedings of the 2002 Conference on Applications, Technologies, Architectures, and Protocols for Computer Communications, Aug. 19-23, 2002, pp. 1-13.

Bickson et al., "A Hybrid Multicast-Unicast Infrastructure for Efficient Publish-Subscribe in Enterprise Networks," SYSTOR 2010, May 24-26, 2010, pp. 1-7.

Castro et al., "SCRIBE: A large-scale and decentralized application-level multicast infrastructure," IEEE Journal on Selected Areas in Communications, vol. 20, No. 8, Oct. 2002, pp. 100-110.

Deering et al., "Multicast Routing in Datagram Internetworks and Extended LANs," ACM Transactions on Computer Systems, vol. 8, No. 2, May 1990, pp. 85-110.

El-Ansary et al., "Efficient Broadcast in Structured P2P Networks," LNCS, the 2nd International Workshop on Peer-to-Peer Systems, vol. 2735, pp. 1-5.

Eugster et al., "The Many Faces of Publish/Subscribe," ACM Computing Surveys, vol. 35, No. 2, Jun. 2003, pp. 114-131.

Tock et al., "Hierarchical Clustering of Message Flows in a Multicast Data Dissemination System," Proceedings of the 17th IASTED International Conference Parallel and Distributed Computing and Systems, Nov. 14-16, 2005, pp. 320-326.

Vigfusson et al., "Dr. Multicast: Rx for Data Center Communication Scalability," EuroSys '10, Apr. 13-16, 2010, pp. 1-14.

Wong et al., "A Preference Clustering Protocol for Large-Scale Multicast Applications," NGC '99, LNCS 1736, 1999, pp. 1-18.

Wong et al., "An Evaluation of Preference Clustering in Large-Scale Multicast Applications," in Proceedings of IEEE INFOCOM, 2000, pp. 451-460.

Guimaraes et al., "A Genetic Algorithm for Multicast Mapping in Publish-Subscribe Systems," 2nd IEEE International Symposium on Network Computing and Applications, Apr. 16-18, 2003, pp. 1-20.

Zhao et al., "Online Network Coding for the Dynamic Multicast Problem," IEEE International Symposium on Information Theory, 2006, pp. 1-5.

* cited by examiner

DYNAMIC FLOW CONTROL IN MULTICAST SYSTEMS

CROSS-REFERENCE TO RELATED APPLICATIONS

This application is a continuation-in-part of and claims priority to U.S. patent application Ser. No. 13/663,500, entitled "Dynamic Flow Control in Multicast Systems", currently abandoned, which, in turn, is a continuation-in-part of and claims priority to U.S. patent application Ser. No. 13/346,747, entitled "Dynamic Mapping in a Multicasting Environment", currently issued as U.S. Pat. No. 8,750,131. The entirety of both applications are incorporated by reference herein.

BACKGROUND

The disclosed subject matter relates generally to optimizing data dissemination in a communication environment, and, more particularly, to a system and method for dynamically controlling the data dissemination flow rates and mappings in a multicasting system.

Multicasting environments provide means to disseminate content related to a great variety of topics to multitudes of subscribers. The content of each topic is delivered over an information flow, where each flow is associated with one or more multicast groups. Multicast groups may be deployed over systems with finite resources. Thus, the number of flows may be considerably larger than the number of groups with multiple flows transmitted over a single group. To manage the relationships between flows and groups, a mapping scheme is used.

Referring to FIG. 1, as an example, flows $F1, F2, \ldots, FK$ are mapped to multicast groups $G1, G2, \ldots, GM$ in order to be transmitted to multiple users $U1, U2, \ldots, UN$, according to the users' interest and subscriptions to different flows. In a large-scale multicast system, the rate of flows will likely vary during deployment. Since each user has a limited reception rate capacity, the rate of each flow may be adjusted and controlled so that users' capacity constraints are not violated both during a fixed mapping of flows to groups and following a change in flow to group mapping.

Setting the rate limits of different flows typically depends on dynamic factors such as the current mapping, users' reception rate capacities, flow priorities and flow rate profiles. Some of these factors are affected by remapping which occurs for example due to change in interests and change of flows rates. Since a multicast system continually evolves due to changes in user subscription and system resources, the flow mappings and flow rates continuously require adjustment. As the adjustments take place, it is important for the system to remain optimized.

BRIEF SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Embodiments of the present invention disclose a method, computer program product, and system for enhancing performance in a multicasting system. Flow rates in a multicasting system are monitored as system characteristics change over time, wherein the multicasting system is operated based on a first mapping between a plurality of data flows and multicasting groups, wherein data is disseminated by way of the mapping to subscribers to one or more of the data flows. The flow rate thresholds of satisfied flows are decreased so as to minimize the difference between the flow rate thresholds and respective target transmission rates of the satisfied flows, as the system's feasible data transmission workload is maintained with respect to subscriber reception rate capacities. The flow rate thresholds of unsatisfied flows are increased so as to minimize the difference between the flow rate threshold and respective target transmission rates for the unsatisfied flows and to limit occurrences of data transmission delays or losses, as the system's feasible data transmission workload is maintained with respect to subscriber reception rate capacities.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
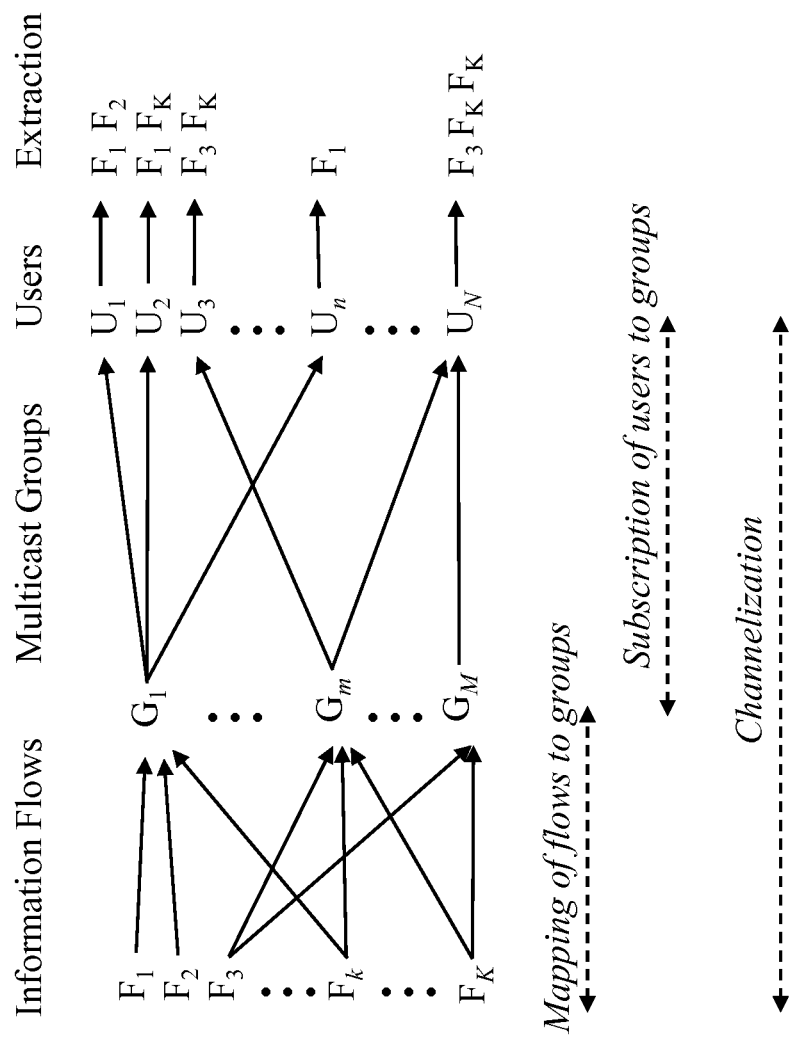
FIG. 1 illustrates an exemplary multicasting environment in accordance with one or more embodiments, wherein a plurality of topic flows are mapped to a plurality of groups and subscribers.
Figure 2:
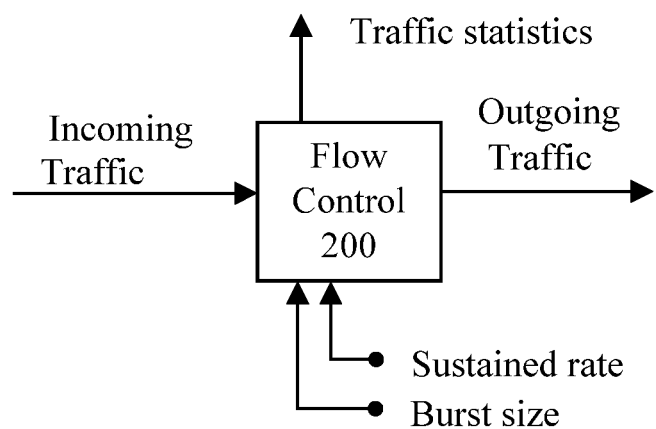
FIG. 2 is a flow diagram of a flow control unit, in accordance with one embodiment.

Referring to FIG. 1, in a multicasting environment, the flow rate refers to the average rate of the flow (e.g., F1) over a course of time. As such, a higher flow rate indicates that more content is being delivered per unit of time and that more bandwidth is being used by the flow. Referring to FIG. 2, flow rate control may be achieved by way of a monitoring mechanism (e.g., a flow control unit 200) that, for a flow, provides the rate of the outgoing traffic based on certain factors including the incoming traffic sustained rate, and burst size.

Depending on implementation, the flow control unit 200 may monitor, limit and adjust the rate at which data is published for each flow in the system, such that a feasible workload is maintained for the system. Flow control unit 200 may be configured to calculate the average rate of the flow as well as the rate variance based on the history of the flow behavior as recorded by the flow's publisher, for example. A target rate for a flow may thus be calculated based on the average rate of the flow plus a variability margin deduced from its rate variance. Flow control unit 200 may also control and set the rate limit at which data may be published for each flow, such that the multicast system maintains a feasible workload.

Feasibility in a multicast system refers to the ability to maintain a dissemination workload, where reception capacity constraints for the subscribers are not violated and a subscriber receives a flow without substantial delay or loss. To avoid delay or loss, traffic statistics may be collected to determine whether sufficient bandwidth is allocated to a flow. Flows with peak rates higher than their maximum allowed rate (i.e., threshold flow rate) are identified by, for example, the flow control unit 200 tracking the length of the respective transmission buffering queues. If the corresponding queues are substantially long, flow rate or bandwidth adjustment may be needed.

If the bandwidth allocated to a flow is sufficient to allow the data to be transmitted to the targeted multicasting groups (and ultimately the subscribers) without any substantial delay or data loss, then the flow is deemed to be satisfied. If the data transmission is delayed or data loss occurs as the result of extensive buffering (i.e., because sufficient transmission bandwidth is not available or allocated to a flow), then the flow is deemed unsatisfied. Certain flows that require rates lower than their flow rate threshold, but experience some buffering may be referred to as semi satisfied and ordered according to the length of their buffered data, for example.

During a multicasting operation, each flow in the system may be monitored and designated as having a threshold flow rate that indicates the maximum allowed transmission rate for that flow depending on system constraints and users' reception rate capacities. The maximum allowed transmission rate or threshold flow rate thus refer to the upper rate limit for a flow. In the following a mapping solution is provided that helps find a mapping that is feasible for the multicast system workload with respect to the flows rate thresholds taking into account to the subscribers' reception rate capacities.

In accordance with one implementation, to avoid data loss or unacceptable levels of delay in multicasting, a resource reallocation process and, where needed, threshold flow rate adjustment and/or a flow remapping approach may be implemented, as provided in further detail below. In one aspect, optionally, no remapping of the multicasting groups is performed, unless the resource reallocation approach or threshold flow rate adjustment do not sufficiently ameliorate the respective flow rate deficiencies in the multicasting system.

Figure 3:
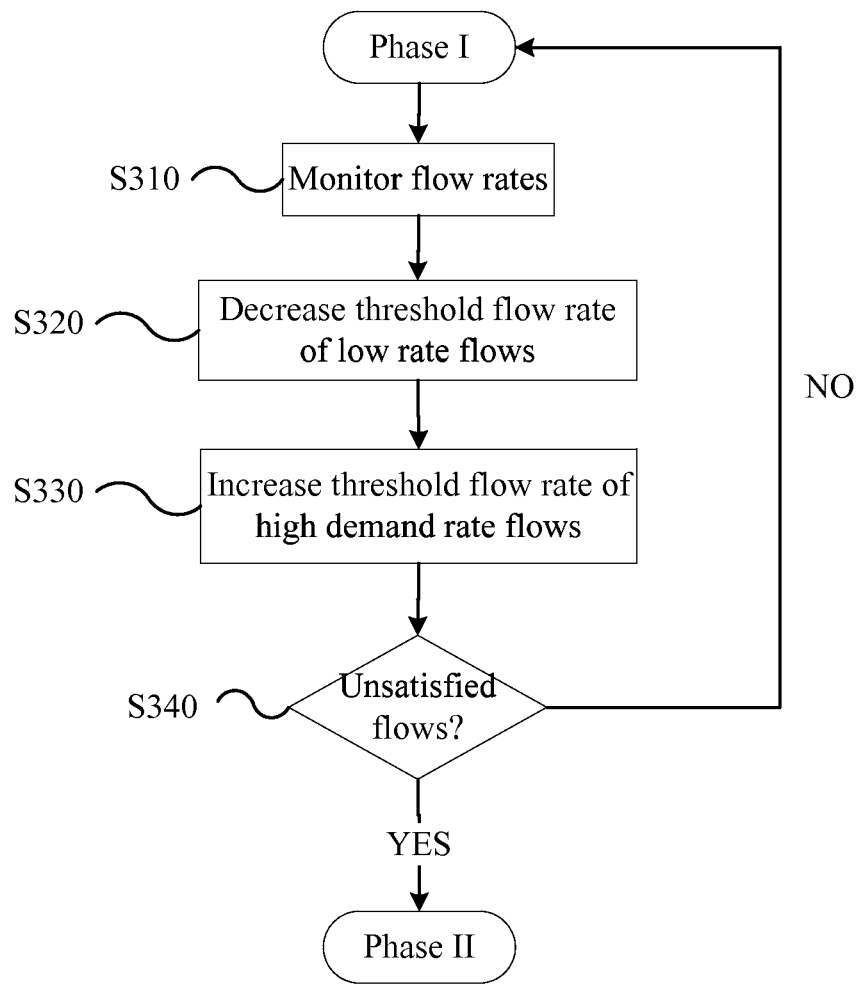
FIG. 3 is an exemplary flow chart of a phase of an optimization process in a multicasting environment, in accordance with one embodiment.

Referring to FIGS. 2 and 3, in one embodiment, a flow control unit 200 may be utilized to monitor the flow rates for different flows in a multicasting system (S310). For satisfied flows that are determined to have a lower flow rate (e.g., based on historic or empirical data analysis) than the threshold flow rate previously assigned to them, attempts may be made to decrease their respective threshold flow rates (S320). Decreasing the threshold flow rate for the satisfied flows may help provide additional transmission bandwidth in the system as a whole, because effectively the previously assigned bandwidth that was not being fully utilized will become available for use by other flows.

If the above-noted decrease in the assigned threshold flow rate for the satisfied flows provides additional bandwidth in the system, or regardless if additional bandwidth is available in the system, in one embodiment, attempts may be made to increase the threshold flow rate assigned to unsatisfied (or semi satisfied) flows (S330), if it is determined that there is no collateral violation of the other constraints in the multicasting system. As such, unsatisfied or semi-satisfied flows would benefit from a higher flow rate than what has been previously assigned to or allowed for such unsatisfied flows.

Constraints that may be inadvertently affected, as a result of increasing the threshold flow rate for one or more unsatisfied flows, relate to the reception rate constraints for the subscribers to a flow. The threshold flow rate increase may, for example, overwhelm a subscriber to a point that the subscriber is unable to process the increased level of data flow directed to a multicast group to which it subscribes. The inability to process the increased data flow level may be due to the subscriber's limited capacity to buffer and filter unwanted flows provided via the multicast group. If a subscriber is unable to process the increased data flow properly, then a constraint violation is deemed to have occurred.

Depending on implementation, the flow rate adjustments (i.e., either the increase or the decrease in the flow rate threshold) may be performed gradually by way incremental increases or decreases in the corresponding flow rates. At each increment, the effects of the adjustment on the subscribers and multicast groups may be evaluated or re-evaluated, until optimization is achieved. FIG. 3 does not illustrate incremental adjustments. However, in one embodiment, if unsatisfied flows remain, the system may revert back to S320 or S330 until no further adjustments are possible, or it is determined that additional adjustments are not beneficial any further or result in violation of system constraints.

Figure 4:
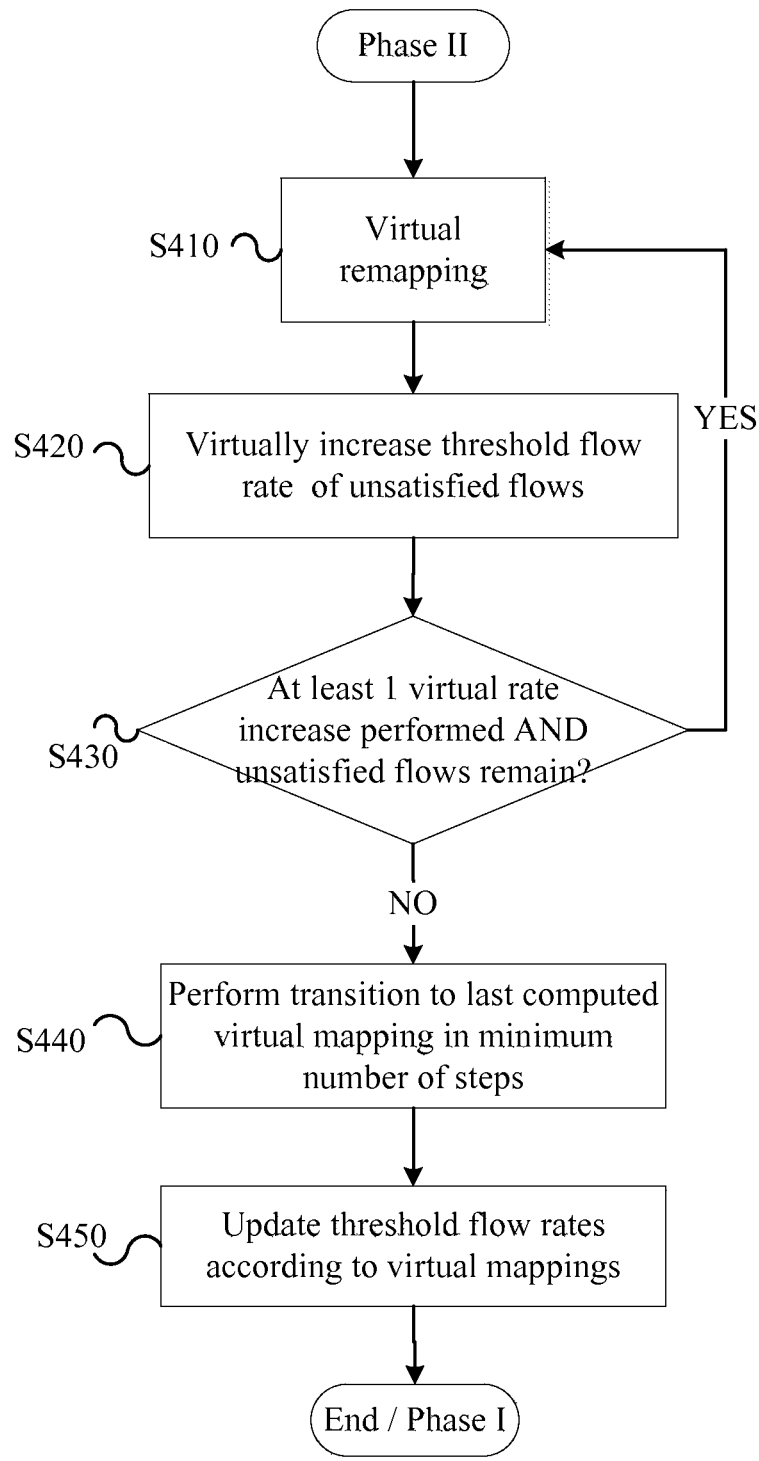
FIG. 4 is an exemplary flow chart of another phase of an optimization process in a multicasting environment, in accordance with one embodiment.

In certain embodiments, if the flow rate adjustments in the first phase illustrated in FIG. 3 do not adequately resolve the transmission loss or delay (i.e., if unsatisfied flows remain (S340)), then a second approach may be considered. Referring to FIG. 4, in a second phase, a proposed mapping (i.e., a "virtual remapping") of the groups in the multicast environment is contemplated (S410). The virtual remapping is calculated prior to enforcing the proposed mapping to target multicasting groups such that the effects of a newly calculated remapping may be virtually determined, prior to committing the new mapping.

If the virtual remapping results indicate that a new mapping may lead to the increase of threshold flow rate for some flows (S420) without violating subscriber's reception rate constraints, then it is determined whether further virtual remapping is needed to satisfy the needs of some remaining unsatisfied flows (S430). If so, another virtual remapping may be calculated (S410), and the virtual remapping process may continue until one or more flows are deemed satisfied, or until it is determined that additional virtual remapping will have no further positive effect on the remaining unsatisfied flows.

Thereafter, the virtual remapping results may be analyzed to determine how to best transition the multicasting system into one or more calculated virtual mappings in one or more steps, and desirably in a minimum number of steps (S440). The transition may thus be performed in one or more steps, with each step being analyzed to determine if any system constraints are violated. Remaps may be performed sequentially, according to the order of calculation resulting in the updating of threshold flow rates for one or more flows according to the calculated virtual mappings (S450).

It is noteworthy that, in one embodiment, the rates are increased virtually at each virtual mapping and thus the actual rate increases are performed after the last virtual mapping is computed and the transition to the last virtual mapping is performed. The transition to the last virtual mapping is the real transition taking place at the end of the process, as until that time the calculated re-mappings are virtual in nature and were not actually performed Note that, depending on implementation, before the transition, the rate increases are not supported by the current mapping in the event of occurrence of violations.

It is further noteworthy that the move from a current mapping to a final virtual mapping may not simply take place in a single transition, since it is not clear what would happen during each individual transition (i.e., when violations could occur). However, a sequential or incremental transition based on the calculated virtual mappings would be feasible (as transition was taken into account during calculations). Thus, in one embodiment, it is desirable to find the minimum sequence of transitions that are needed for a proper transitioning to the final virtual mapping.

Figure 5:
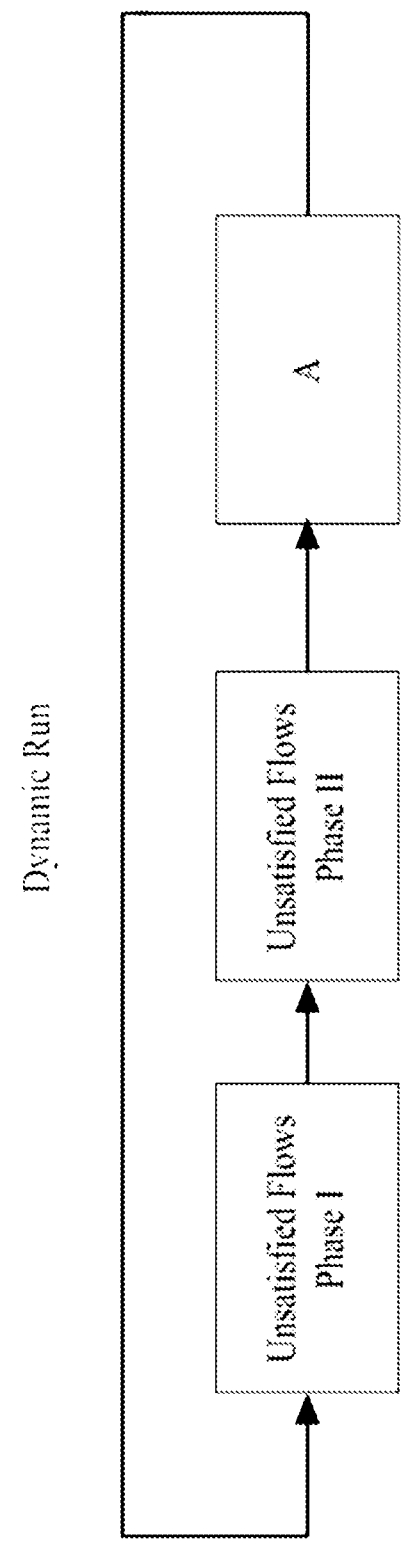
FIGS. 5 and 6 illustrate a block diagram for a dynamic run of the different phases of the optimization process shown in FIGS. 3 and 4, in accordance with one embodiment.
Figure 6:
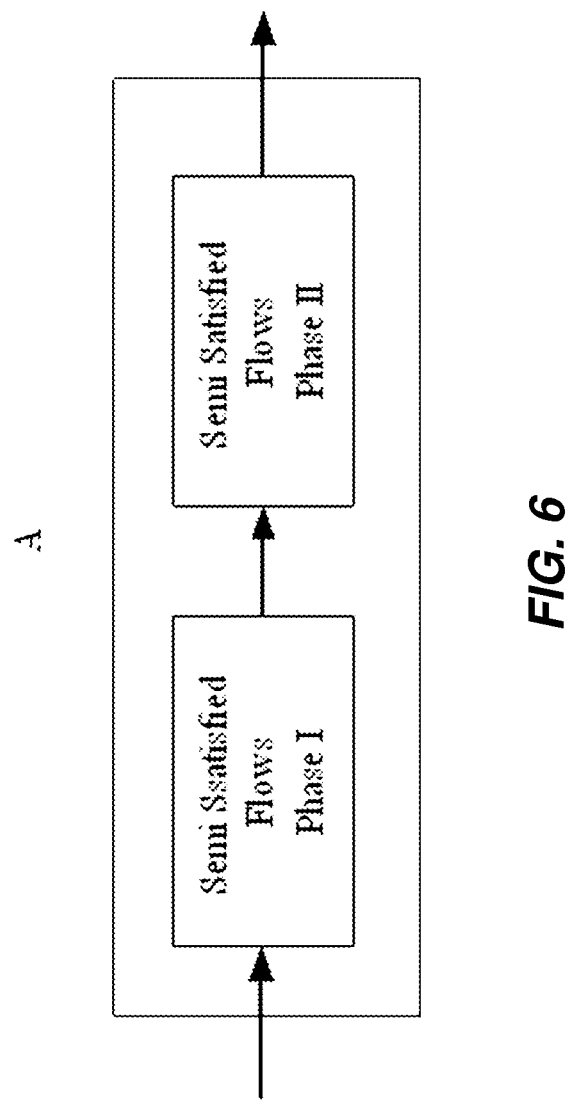

It is noteworthy that in the second phase, if none of the contemplated virtual maps allow for more rate increases without violating systems constraints, then it may be determined that it is not worthwhile to perform the re-mapping and further processing under the second phase may be aborted. It is further noteworthy that the application of the methods and processes, disclosed in the first and second phases, may be in a different order than that disclosed herein. For example, referring to FIGS. 5 and 6, the process disclosed in the first phase may be applied to data flows that are deemed unsatisfied, and then the same or similar process may be applied to data flows that are deemed semi satisfied.

In the above disclosure, an exemplary optimization scheme in accordance with one or more embodiments is provided. In one exemplary embodiment, a multicasting model and a remapping algorithm in addition to one or more methods for calculating the associated costs may be implemented. It is noteworthy that the detailed features disclosed are by way of example and should not be construed as limiting the scope of the claimed subject matter to the particular details. Such details are provided to help better understand the underlying features and elements.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 7A:
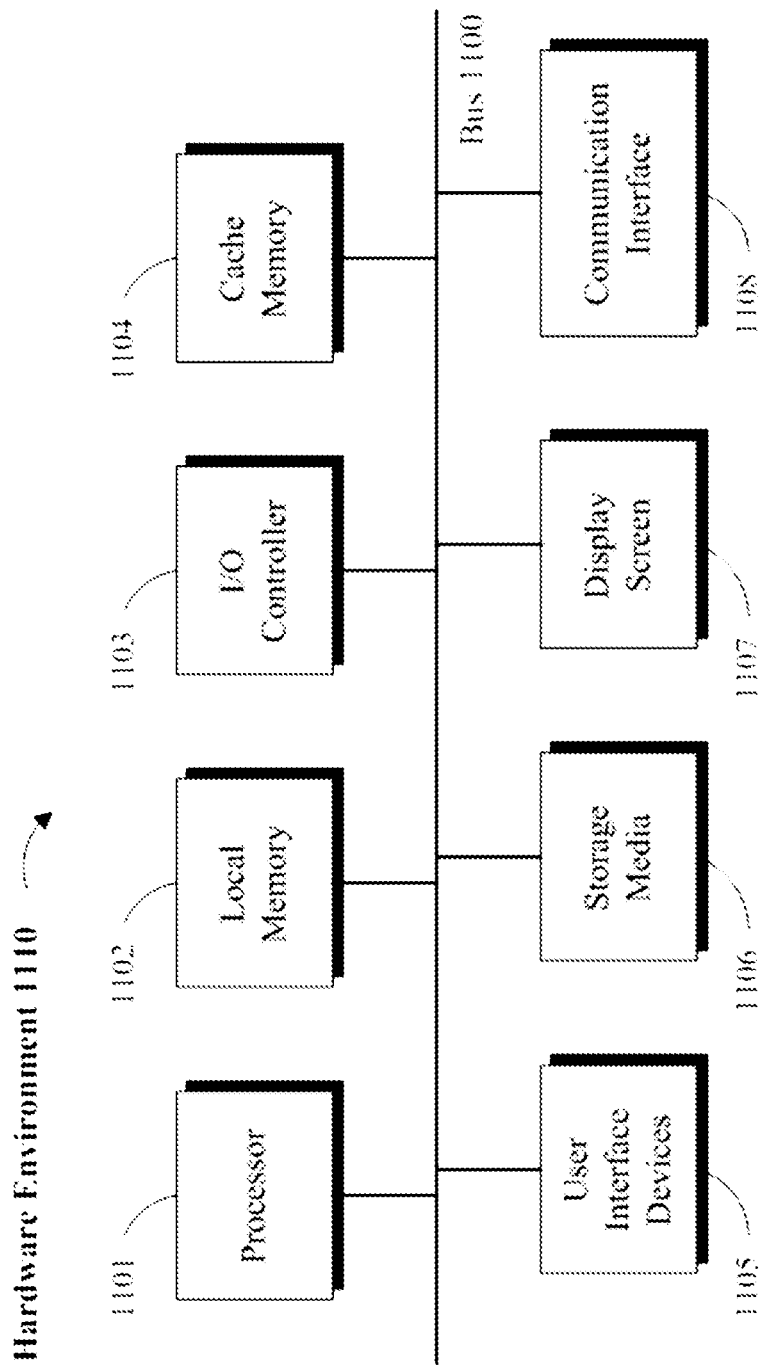
FIGS. 7A and 7B are block diagrams of hardware and software environments in which the disclosed systems and methods may operate, in accordance with one or more embodiments.
Figure 7B:
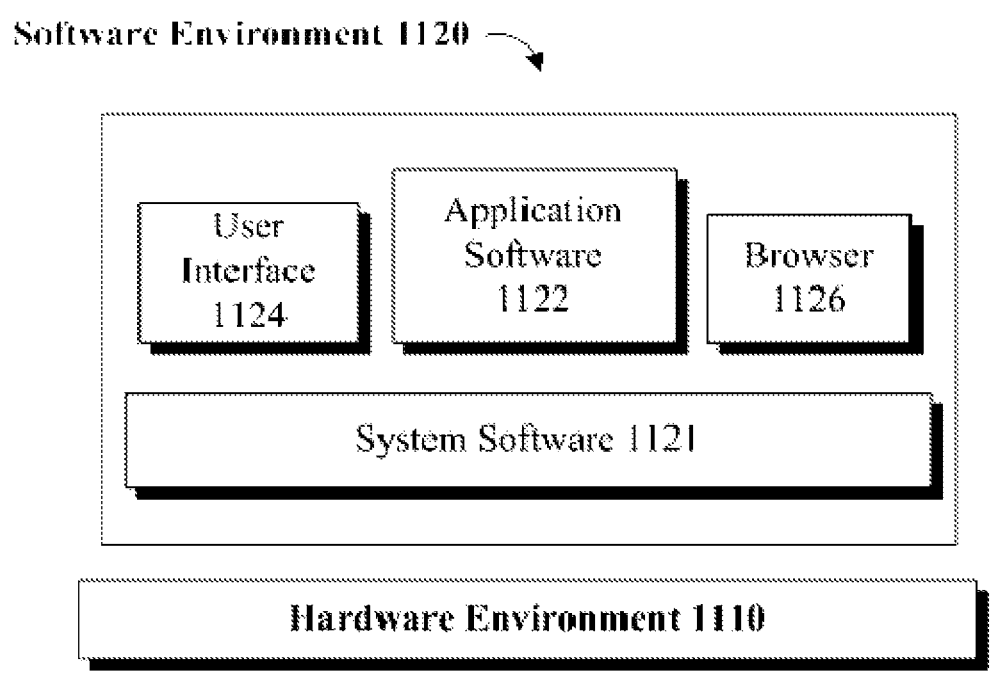

Referring to FIGS. 7A and 7B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 7A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embedded in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 7B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for enhancing performance in a multicasting system, the method comprising:
   monitoring, by a computer, data flow rates in a multicasting system as system characteristics change over time, wherein the multicasting system is operating based on a first mapping between a plurality of data flows and multicasting groups, wherein data is disseminated by way of the mapping to subscribers to one or more of the data flows;
   decreasing, by the computer, flow rate thresholds of satisfied flows so as to minimize the difference between the flow rate thresholds and respective target transmission rates of the satisfied flows, as the system's feasible data transmission workload is maintained with respect to subscriber reception rate capacities, wherein a flow is deemed satisfied when bandwidth allocated to the flow is sufficient to allow the data to be transmitted without any substantial delay or data loss;
   increasing, by the computer, flow rate thresholds of unsatisfied flows so as to minimize the difference between the flow rate threshold and respective target transmission rates for the unsatisfied flows and to limit occurrences of data transmission delays or losses, as the system's feasible data transmission workload is maintained with respect to subscriber reception rate capacities, wherein a flow is deemed unsatisfied when data transmission is delayed or data loss occurs;
   calculating a proposed mapping prior to enforcing the proposed mapping so that effects may be virtually determined and incrementally remapping, by the computer the data flows using at least a second mapping according to the proposed mapping calculated in response to determining, by the computer, that at least one flow remains with a target flow higher than the respective flow rate threshold for the flow; and
   performing, by the computer, a system transition from the first mapping to the second mapping in a minimum number of steps, each step being analyzed to determine if any system constraints are violated, wherein at least another mapping is calculated as a part of the incremental virtual remapping between the first mapping and the second mapping and the constraints of the multicasting system relate to one of overhead associated with data filtering, user reception rates, and flow rate thresholds.

2. The method of claim 1 wherein the system transition is performed taking into account maintaining a feasible data transmission for the multicasting system's workload during transition.

3. The method of claim 1 wherein the system transition is performed taking into account subscriber reception rate capacities in the multicasting system during transition.

4. The method of claim 1 further comprising incrementally updating, by the computer, flow rate thresholds according to the virtually computed remapping.

5. The method of claim 1 wherein the monitoring continues to determine which flows' target flow rates are lower than the respective threshold flow rate determined for a flow.

6. The method of claim 1 wherein a subscriber's reception rate capacity is determined based on level of resources allocated to the subscriber for processing data transmitted to the subscriber from the multicast groups to which the subscriber has subscribed.

7. A computer system for enhancing performance in a multicasting environment, the computer system comprising:
   one or more computer processors, one or more computer-readable storage media, and program instructions stored on one or more of the computer-readable storage media for execution by at least one of the one or more processors, the program instructions comprising:

program instructions to monitor data flow rates in a multicasting system as system characteristics change over time, wherein the multicasting system is operating based on a first mapping between a plurality of data flows and multicasting groups, wherein data is disseminated by way of the mapping to subscribers to one or more of the data flows;

program instructions to decrease flow rate thresholds of satisfied flows so as to minimize the difference between the flow rate thresholds and respective target transmission rates of the satisfied flows, as the system's feasible data transmission workload is maintained with respect to subscriber reception rate capacities, wherein flows are deemed satisfied when bandwidth allocated to the flow is sufficient to allow the data to be transmitted without any substantial delay or data loss;

program instructions to increase flow rate thresholds of unsatisfied flows, so as to minimize the difference between the flow rate threshold and respective target transmission rates for the unsatisfied flows and to limit occurrences of data transmission delays or losses, as the system's feasible data transmission workload is maintained with respect to subscriber reception rate capacities, wherein flows are deemed unsatisfied when data transmission is delayed or data loss occurs;

program instructions to calculate a proposed mapping prior to enforcing the proposed mapping so that effects may be virtually determined and incrementally remap the data flows using at least a second mapping according to the proposed mapping calculated in response to determining that at least one flow remains with a target flow rate higher than the respective flow rate threshold for the flow; and program instructions to perform a system transition from the first mapping to the second mapping in a minimum number of steps, each step being analyzed to determine if any system constraints are violated, wherein at least another mapping is calculated as a part of the incremental virtual remapping between the first mapping and the second mapping and the constraints of the multicasting system relate to one of overhead associated with data filtering, user reception rates, and flow rate thresholds.

8. The computer system of claim 7 wherein the system transition is performed taking into account maintaining a feasible data transmission for the multicasting system's workload during transition.

9. The computer system of claim 7 wherein the system transition is performed taking into account subscriber reception rate capacities in the multicasting system during transition.

10. A computer program product for enhancing performance in a multicasting environment, the computer program product comprising:

one or more computer-readable non-transitory storage media and program instructions stored on the one or more computer-readable storage media, the program instructions comprising:

program instructions to monitor data flow rates in a multicasting system as system characteristics change over time, wherein the multicasting system is operating based on a first mapping between a plurality of data flows and multicasting groups, wherein data is disseminated by way of the mapping to subscribers to one or more of the data flows;

program instructions to decrease flow rate thresholds of satisfied flows so as to minimize the difference between the flow rate thresholds and respective target transmission rates of the satisfied flows, as the system's feasible data transmission workload is maintained with respect to subscriber reception rate capacities, wherein flows are deemed satisfied when bandwidth allocated to the flow is sufficient to allow the data to be transmitted without any substantial delay or data loss;

program instructions to increase flow rate thresholds of unsatisfied flows so as to minimize the difference between the flow rate threshold and respective target transmission rates for the unsatisfied flows and to limit occurrences of data transmission delays or losses, as the system's feasible data transmission workload is maintained with respect to subscriber reception rate capacities, wherein flows are deemed unsatisfied when data transmission is delayed or data loss occurs;

program instructions to calculate a proposed mapping prior to enforcing the proposed mapping so that effects may be virtually determined and incrementally remap the data flows using at least a second mapping according to the proposed mapping calculated in response to determining that at least one flow remains with a target flow rate higher than the respective flow rate threshold for the flow; and program instructions to perform a system transition from the first mapping to the second mapping in a minimum number of steps, each step being analyzed to determine if any system constraints are violated, wherein at least another mapping is calculated as a part of the incremental virtual remapping between the first mapping and the second mapping and the constraints of the multicasting system relate to one of overhead associated with data filtering, user reception rates, and flow rate thresholds.

11. The computer program product of claim 10 wherein the system transition is performed taking into account maintaining a feasible data transmission for the multicasting system's workload during transition.

12. The computer program product of claim 10 wherein the system transition is performed taking into account subscriber reception rate capacities in the multicasting system during transition.

* * * * *